(12) United States Patent
Wei et al.

(10) Patent No.: US 11,872,942 B2
(45) Date of Patent: Jan. 16, 2024

(54) DYNAMIC LONGITUDINAL AND LATERAL ADJUSTMENT OF AWARENESS LINES FOR COMMERCIAL VEHICLE CAMERA MIRROR SYSTEM

(71) Applicant: Stoneridge Electronics AB, Solna (SE)

(72) Inventors: Wenpeng Wei, Novi, MI (US); Liang Ma, Rochester, MI (US); Troy Otis Cooprider, White Lake, MI (US)

(73) Assignee: STONERIDGE ELECTRONICS AB, Solna (SE)

( * ) Notice: Subject to any disclaimer, the term of this patent is extended or adjusted under 35 U.S.C. 154(b) by 0 days.

(21) Appl. No.: 18/124,646

(22) Filed: Mar. 22, 2023

(65) Prior Publication Data

US 2023/0311771 A1   Oct. 5, 2023

Related U.S. Application Data

(60) Provisional application No. 63/325,788, filed on Mar. 31, 2022.

(51) Int. Cl.
  *B60R 1/25* (2022.01)
  *G06T 7/73* (2017.01)

(52) U.S. Cl.
  CPC ............. *B60R 1/25* (2022.01); *G06T 7/73* (2017.01); *B60R 2300/307* (2013.01); *B60R 2300/8046* (2013.01); *G06T 2207/30248* (2013.01)

(58) Field of Classification Search
  CPC ............ B60R 1/25; B60R 2300/307; B60R 2300/8046; G06T 7/73; G06T 2207/30248
  See application file for complete search history.

(56) References Cited

U.S. PATENT DOCUMENTS

| | | | |
|---|---|---|---|
| 2020/0346581 A1* | 11/2020 | Lawson | B60R 1/0612 |
| 2021/0291738 A1* | 9/2021 | Lang | B60R 1/12 |
| 2021/0339686 A1* | 11/2021 | Koller | B60R 11/04 |
| 2021/0394686 A1 | 12/2021 | Germaine et al. | |

FOREIGN PATENT DOCUMENTS

EP  3029929 A1 *  6/2016  ............... B60R 1/00

OTHER PUBLICATIONS

International Search Report and Written Opinion for International Application No. PCT/US2023/015850 dated Jun. 29, 2023.
"How to operate Mercedes-Benz MirrorCam—Australian Roadtrains," Mar. 9, 2022, pp. 1-16, XP093047196, https://web.archive.org/web/20220309152609/https://www.roadtrains.com.au/tech-tips/how-to-operate-mercedes-benz-mirrorcam/.

* cited by examiner

*Primary Examiner* — Kyle M Lotfi
(74) *Attorney, Agent, or Firm* — Carlson, Gaskey & Olds, P.C.

(57) ABSTRACT

A method of providing a trailer end line for a tractor-trailer includes determining a fixed point on a tractor, determining a trailer angle of a trailer, determining a trailer line that is arranged at the trailer angle from the fixed point, determining an intersection point between the trailer line and a trajectory of a reference point on the trailer, determining a trailer end point along the trailer line and offset from the intersection point, and displaying a trailer end awareness line based upon the determined trailer end point.

20 Claims, 11 Drawing Sheets

DYNAMIC LONGITUDINAL AND LATERAL ADJUSTMENT OF AWARENESS LINES FOR COMMERCIAL VEHICLE CAMERA MIRROR SYSTEM

CROSS-REFERENCE TO RELATED APPLICATION

This application claims priority to Untied States Provisional Application No. 63/325,788 filed Mar. 31, 2022.

TECHNICAL FIELD

This disclosure relates to wheel tracking using a camera mirror system (CMS) of a commercial truck, and more specifically to a system and method for tracking a wheel position while the wheel is hidden.

BACKGROUND

Mirror replacement systems, and camera systems for supplementing mirror views, are utilized in commercial vehicles to enhance the ability of a vehicle operator to see a surrounding environment. Camera mirror systems (CMS) utilize one or more cameras to provide an enhanced field of view to a vehicle operator. In some examples, the mirror replacement systems cover a larger field of view than a conventional mirror, or include views that are not fully obtainable via a conventional mirror.

Semi-automated driver assist systems, camera mirror systems, electronic stability program systems, and other vehicle systems, use or require knowledge about the location of various vehicle features throughout operation of the vehicle. Among those features can be a real world position or a position in an image of one or more of the rear wheels of the trailer. Systems exist for tracking the position of the wheel while it is visible within the field of view of a rear facing camera mirror system camera. However, while the trailer is at a low trailer angle the rear trailer wheels are not visible in the field of view of either the driver or passenger side cameras and the real world position of the wheels, and the position of the wheels in the image, is unknown.

It is also desirable to know the trailer end position, as the driver needs positional awareness of this trailer feature, particular during relatively straight driving or very slight trailer angles for which the trailer end is difficult to see.

SUMMARY

In one exemplary embodiment, a method of providing a trailer end line for a tractor-trailer includes determining a fixed point on a tractor, determining a trailer angle of a trailer, determining a trailer line that is arranged at the trailer angle from the fixed point, determining an intersection point between the trailer line and a trajectory of a reference point on the trailer, determining a trailer end point along the trailer line and offset from the intersection point, and displaying a trailer end awareness line based upon the determined trailer end point.

In a further embodiment of any of the above, the fixed point determining step includes estimating a tractor wheel position.

In a further embodiment of any of the above, the tractor wheel position estimating includes identifying a first set of wheel locations in at least a first image, each of the wheel locations in the first set of wheel locations are associated with a corresponding trailer angle, clustering the first set of wheel locations and identifying a primary cluster in the first set of wheel locations, generating a best fit curve that is applied to the primary cluster, the best fit curve is a curve that associates wheel position to trailer angle, identifying an estimated wheel position by applying a determined trailer angle to the best fit curve in response to the wheel being hidden in the first image, and outputting the estimated wheel position to at least one additional vehicle system.

In a further embodiment of any of the above, the trailer angle determining step includes using a trailer angle sensor, a CMS image analysis, or a combination thereof.

In a further embodiment of any of the above, the method includes a step of adjusting the displayed trailer end awareness line according to a change in the determined trailer angle.

In a further embodiment of any of the above, the reference point is determined by estimating a trailer wheel position.

In a further embodiment of any of the above, the trajectory of the reference point corresponds to the trailer wheel position fitted as a parabola.

In a further embodiment of any of the above, the trailer wheel position estimating includes identifying a first set of wheel locations in at least a first image, each of the wheel locations in the first set of wheel locations are associated with a corresponding trailer angle, clustering the first set of wheel locations and identifying a primary cluster in the first set of wheel locations, generating a best fit curve that is applied to the primary cluster, the best fit curve is a curve associating wheel position to trailer angle, identifying an estimated wheel position by applying a determined trailer angle to the best fit curve in response to the wheel being hidden in the first image, and outputting the estimated wheel position to at least one additional vehicle system.

In a further embodiment of any of the above, the trailer end point determining step includes calculating a relationship between the intersection point and the trailer endpoint in a tractor longitudinal direction, y, and a tractor lateral direction, x.

In a further embodiment of any of the above, the relationship is calculated according to the equations $$x_t = x_i - \frac{\Delta y}{\tan(\theta)} \text{ and } y_t = y_i + \Delta y,$$

wherein $x_i$, $y_i$ correspond to the wheel intersection point, $x_t$, $y_t$ correspond to the trailer end point, and $\theta$ corresponds to the steering angle.

In a further embodiment of any of the above, the displayed trailer end awareness line is spaced from the trailer end point.

In a further embodiment of any of the above, the trailer end awareness line is a first awareness line that is displayed in a first color and corresponds to a location of the trailer end projected on ground at a location beneath the trailer end. The displaying step includes displaying a second awareness line in a second color different than the first color, and the second awareness line corresponds to a location on the ground a distance aft of the first awareness line.

In a further embodiment of any of the above, the trailer end awareness line is displayed on one side only of trailer for steering angles greater than 0° but less than a predetermined steering angle.

In a further embodiment of any of the above, the trailer end awareness line is displayed only on a side of an inner turning radius of the trailer end.

In a further embodiment of any of the above, the trailer end awareness line is displayed on both sides of trailer for steering angles around 0°, and the trailer end awareness lines are not displayed at all for steering angles above the predetermined steering angle.

In another exemplary embodiment, a camera mirror system includes a camera arm that has a camera with an image capture unit that is configured to capture a desired field of view, the desired field of view includes at least one of Class II and Class IV views, a display that is configured to display the desired field of view, a controller that is in communication with the image capture unit and the display, the controller is configured to determine a fixed point on a tractor, determine a trailer angle of a trailer, determine a trailer line that is arranged at the trailer angle from the fixed point, determine an intersection point between the trailer line and a trajectory of a reference point on the trailer, determine a trailer end point along the trailer line and offset from the intersection point, and display a trailer end awareness line on the display based upon the determined trailer end point.

In a further embodiment of any of the above, the fixed point is determined by estimating a tractor wheel position.

In a further embodiment of any of the above, the trailer angle is determined using a trailer angle sensor, a CMS image analysis, or a combination thereof.

In a further embodiment of any of the above, the controller is configured to adjust the displayed trailer end awareness line according to a change in the determined trailer angle.

In a further embodiment of any of the above, the reference point is determined by estimating a trailer wheel position.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments unless such features are incompatible.

DETAILED DESCRIPTION

Figure 1A:
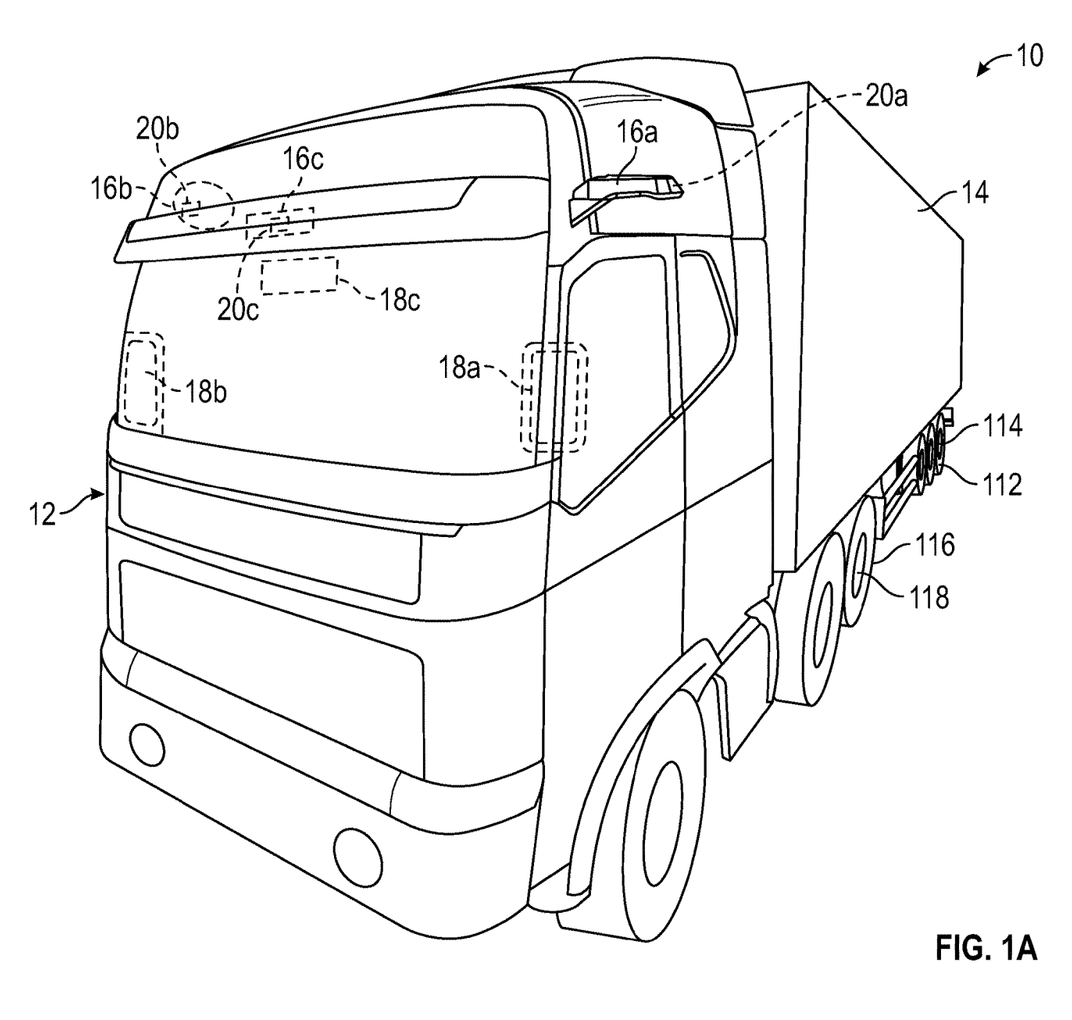
FIG. 1A is a schematic front view of a commercial truck with a camera mirror system (CMS) used to provide at least Class II and Class IV views.
Figure 1B:
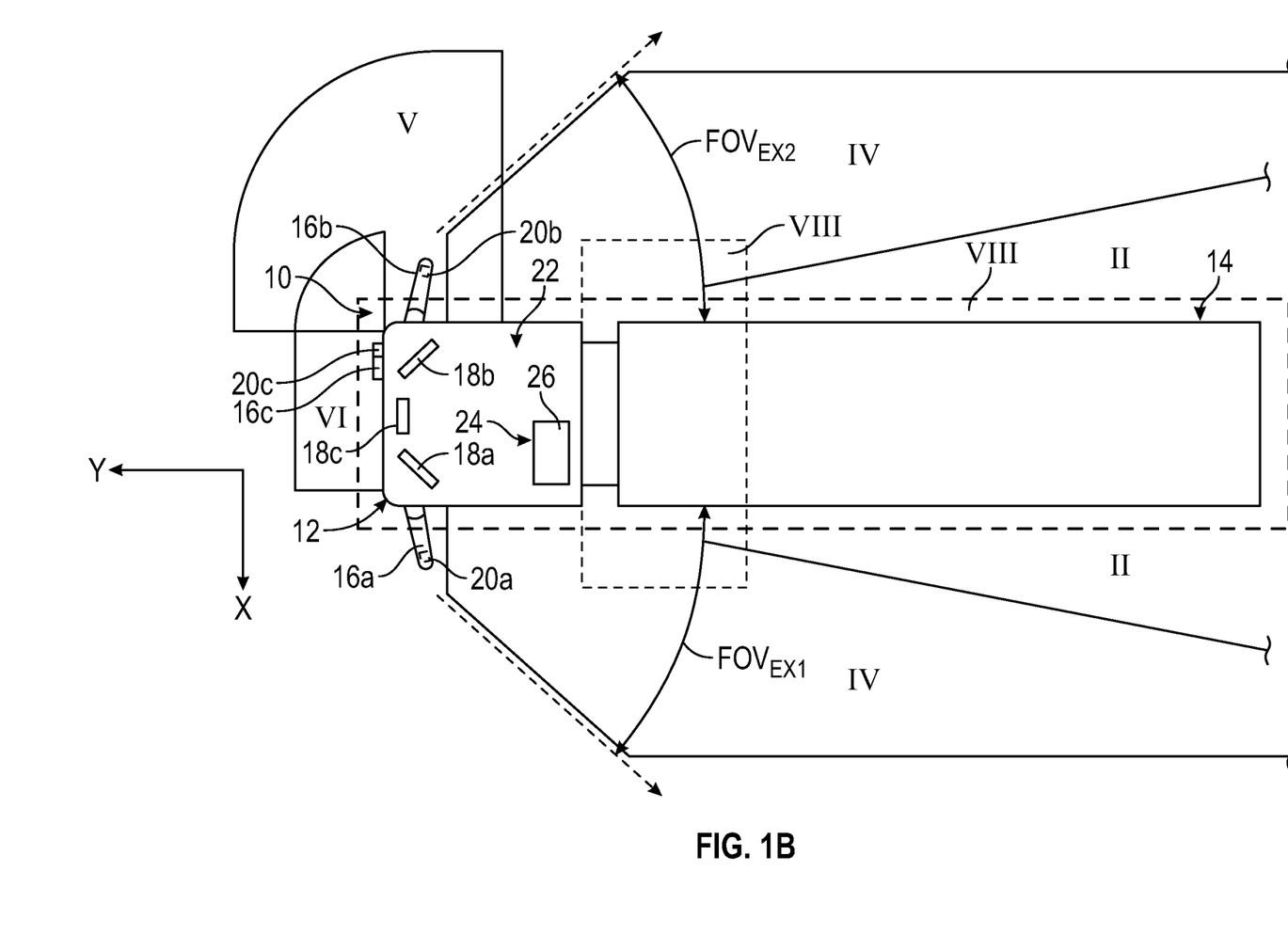
FIG. 1B is a schematic top elevational view of a commercial truck with a camera mirror system providing Class II, Class IV, Class V and Class VI views.

A schematic view of a commercial vehicle 10 is illustrated in FIGS. 1A and 1B. The vehicle 10 includes a vehicle cab or tractor 12 for pulling a trailer 14. Although a commercial truck is contemplated in this disclosure, the invention may also be applied to other types of vehicles. The vehicle 10 incorporates a camera mirror system (CMS) 15 (FIG. 2) that has driver and passenger side camera arms 16a, 16b mounted to the outside of the vehicle cab 12. If desired, the camera arms 16a, 16b may include conventional mirrors integrated with them as well, although the CMS 15 can be used to entirely replace mirrors. In additional examples, each side can include multiple camera arms, each arm housing one or more cameras and/or mirrors.

Each of the camera arms 16a, 16b includes a base that is secured to, for example, the cab 12. A pivoting arm is supported by the base and may articulate relative thereto. At least one rearward facing camera 20a, 20b is arranged respectively within camera arms. The exterior cameras 20a, 20b respectively provide an exterior field of view $FOV_{EX1}$, $FOV_{EX2}$ that each include at least one of the Class II and Class IV views (FIG. 1B), which are legal prescribed views in the commercial trucking industry. Multiple cameras also may be used in each camera arm 16a, 16b to provide these views, if desired. Each arm 16a, 16b may also provide a housing that encloses electronics that are configured to provide various features of the CMS 15.

First and second video displays 18a, 18b are arranged on each of the driver and passenger sides within the vehicle cab 12 on or near the A-pillars 19a, 19b to display Class II and Class IV views on its respective side of the vehicle 10, which provide rear facing side views along the vehicle 10 that are captured by the exterior cameras 20a, 20b.

If video of Class V and Class VI views are also desired, a camera housing 16c and camera 20c may be arranged at or near the front of the vehicle 10 to provide those views (FIG. 1B). A third display 18c arranged within the cab 12 near the top center of the windshield can be used to display the Class V and Class VI views, which are toward the front of the vehicle 10, to the driver.

Figure 2:
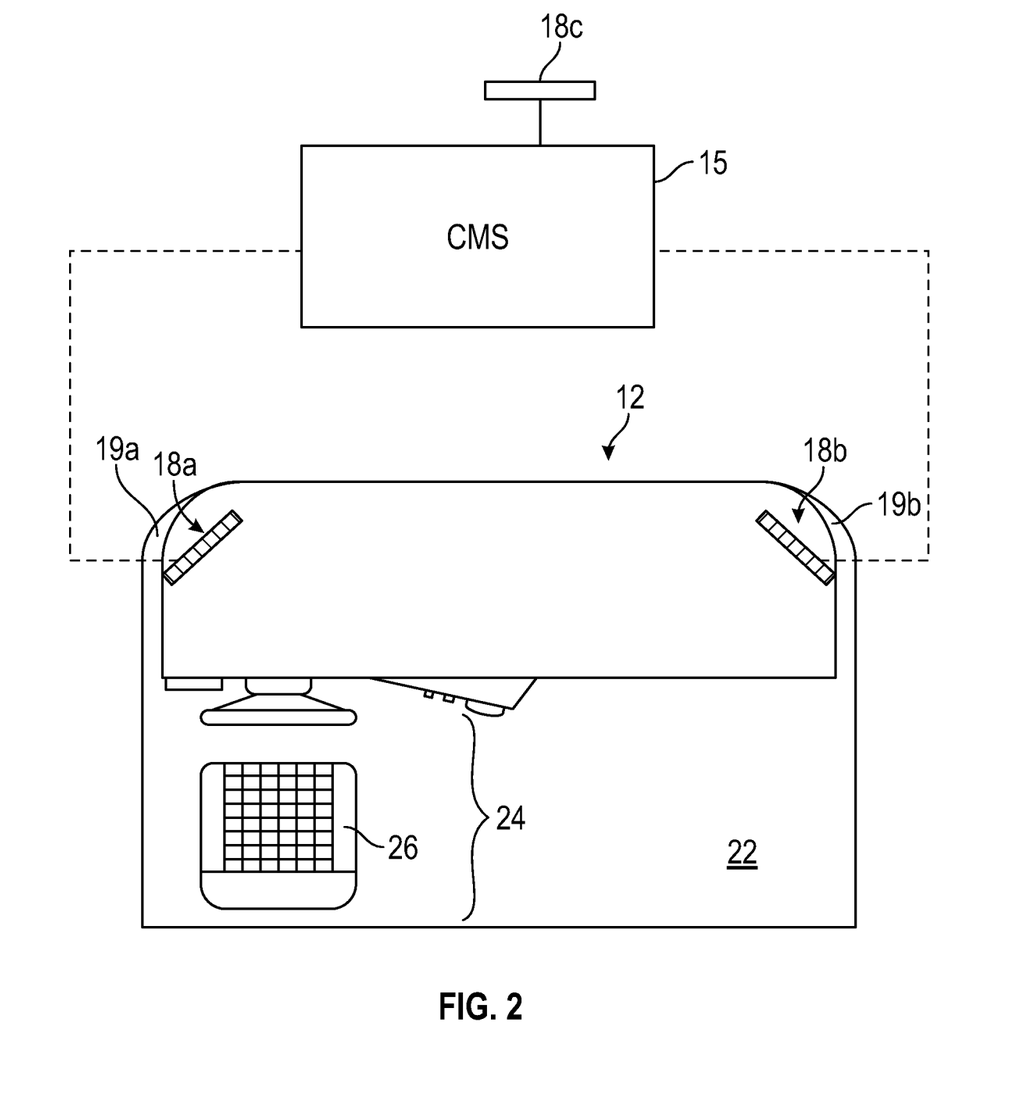
FIG. 2 is a schematic top perspective view of a vehicle cabin including displays and interior cameras.

If video of class VIII views is desired, camera housings can be disposed at the sides and rear of the vehicle 10 to provide fields of view including some or all of the class VIII zones of the vehicle 10. In such examples, the third display 18c can include one or more frames displaying the class VIII views. Alternatively, additional displays can be added near the first, second and third displays 18a, 18b, 18c and provide a display dedicated to providing a class VIII view. The displays 18a, 18b, 18c face a driver region 24 within the cabin 22 where an operator is seated on a driver seat 26.

Figure 3A:
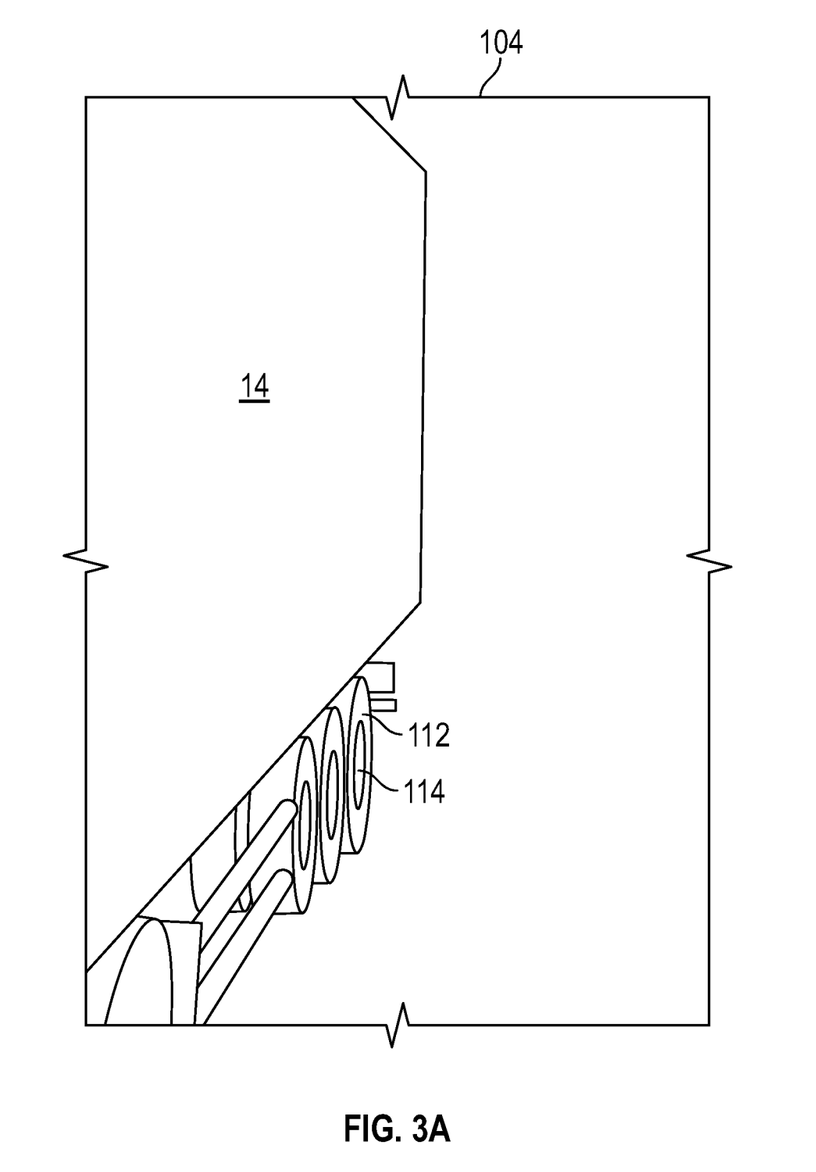
FIG. 3A illustrates a camera mirror system view including a single view of a vehicle trailer at a mid to large trailer angle.
Figure 3B:
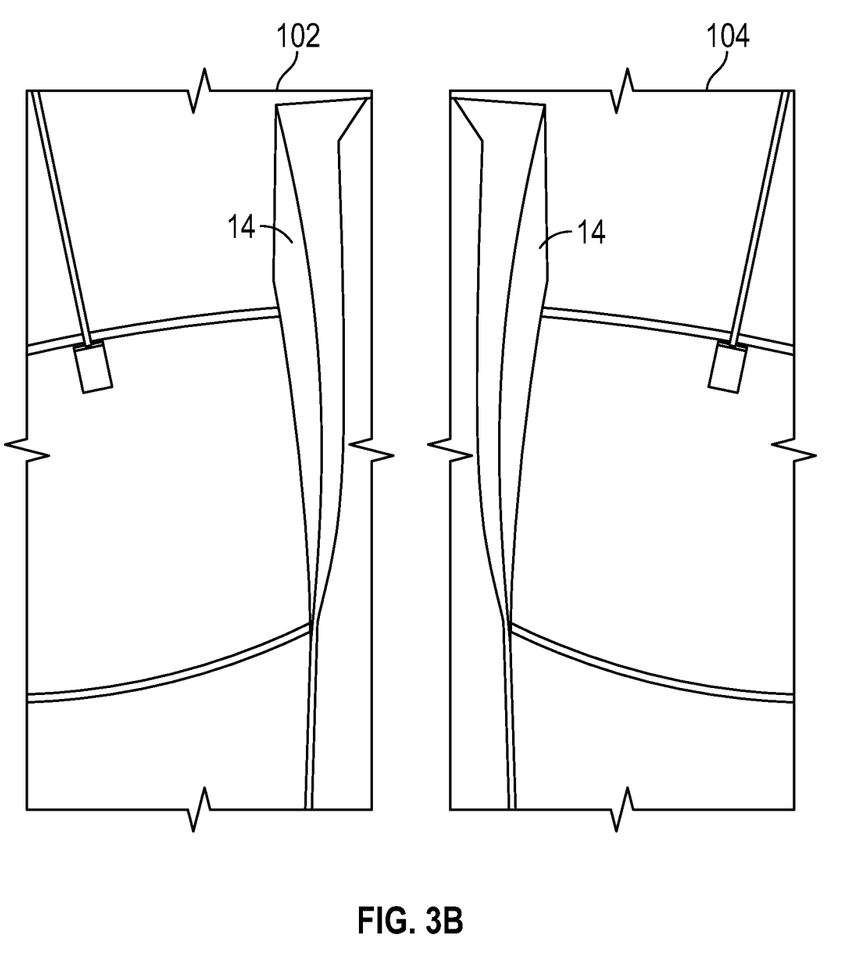
FIG. 3B illustrates a camera mirror system view including two views of a vehicle trailer at a low trailer angle.

With continued reference to FIGS. 1A-2, FIG. 3A schematically illustrates a rear view displayed to a vehicle operator via the CMS described above, while the trailer 14 is at a mid to large (e.g., greater than 10 degree) angle. While at the mid to large trailer angle, the trailer 14 is minimally visible in the opposite view, if it is visible at all, and the opposite view is omitted. FIG. 3B schematically illustrates the trailer 14 in both a driver side display 102 and a passenger side display 104. While the trailer 14 is at the mid to large angle, a rearmost wheel 112 is visible in the corresponding view 104. In contrast, when the trailer 14 is at a low trailer angle (FIG. 3B), the wheel 112 is not visible. As it is not visible, the wheel 112 is referred to as hidden. While the exact angle at which the wheel 112 becomes hidden will depend on the position of the camera generating the view, and the length of the trailer 14, the wheel 112 is typically hidden at the low angles (e.g. between 10 and −10 degrees).

In order to facilitate vehicle systems relying on the wheel 112 position, such as advanced driver assistance systems, camera mirror systems, electronic stability programs, and similar vehicle systems, the CMS monitors the views 102, 104 and identifies the wheel position 112 during any operating condition where the wheel 112 is visible. Existing object tracking systems can identify the wheel 112 when it is visible and track the center point 114 of the wheel 112 as it travels through the image. The position in the image can then be translated to a real-world 3D position again using known systems. In addition to using these monitored wheel positions, the CMS generates a data set from each image, with each point in each of the data sets identifying a center point 114 of the wheel 112 in the image and coordinating the center point 114 of the wheel 112 with an angle of the trailer 14 at which the wheel position was detected. The angle of the trailer 14 is detected using one of a trailer angle sensor, CMS image analysis, or a combination of the two.

Based on relationships established using the wheel 112 detections and trailer angles while the wheel(s) 112 are visible, the CMS is configured to determine a best fit curve for estimating the wheel 112 positions while the wheel(s) 112 are hidden during the low angles shown in FIG. 3B and while the wheel is hidden due to other external effects, including low light and heavy rain. The estimated wheel positions are provided to any CMS or other vehicle systems that use the information, thereby providing a continuous wheel position to the CMS or other vehicle systems.

Figure 8:
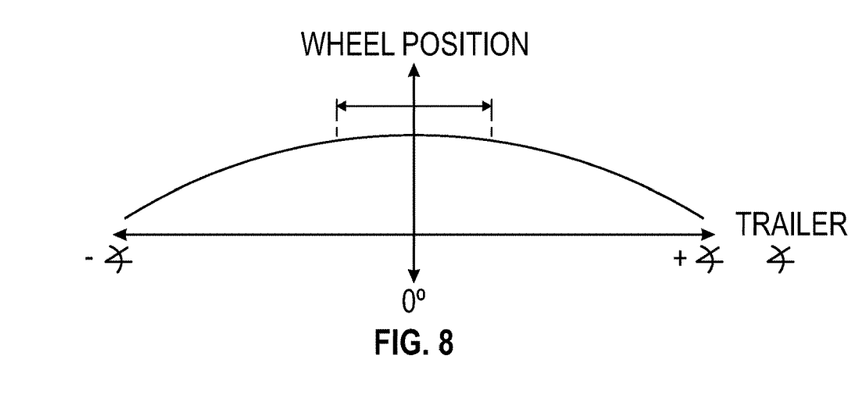
FIG. 8 illustrates the best fit curve line isolated from the data set.
Figure 9:
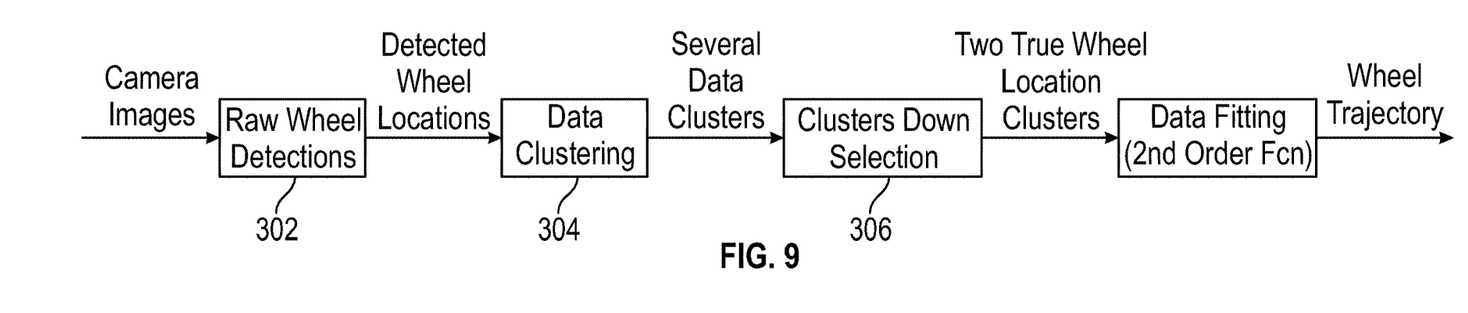
FIG. 9 illustrates a process flow describing the transformation of raw wheel location data to the best fit curve illustrated in FIGS. 4-8.

With continued reference to FIGS. 1-3B, FIGS. 4-8 illustrate an on the road process for generating a wheel position estimation specific to a currently attached trailer 14 and FIG. 9 illustrates the process 300 flow for operating on the data sets of FIGS. 4-7. The process is capable of estimating hidden wheel positions without requiring trailer parameters such as height and length. While the example of FIGS. 4-9 is illustrated using data from a driver side view 102 and a passenger side view 104 (see FIG. 3B), resulting in an approximately symmetrical image, it is appreciated that, due to the symmetrical nature, a similar process can be applied to only a single view and generate similar wheel position estimations.

Figure 4:
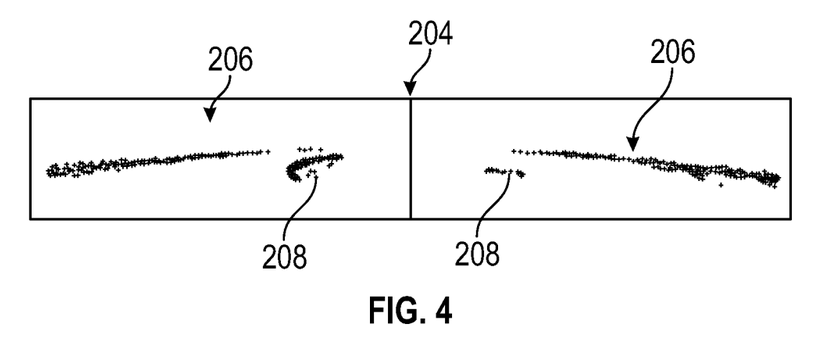
FIG. 4 illustrates a data set of trailer wheel positions within the image(s)

Initially upon operation of the vehicle wheel position data is aggregated over time to create a raw wheel position data set 204, illustrated in FIG. 4, in a "Raw Wheel Detections" step 302. The raw wheel detections use image analysis to identify wheel positions (i.e., the position of the wheel center point in the image) within the images provided by the CMS. Once the data set has been sufficiently populated to generate an estimation curve the data set 204 is referred to as a full data set. In some examples, the full data set includes at least approximately 100-150 wheel detections 204, for example. In addition to the position of the center point 114 of the wheel 112 in the image, each data point has an associated corresponding trailer angle, as determined by any available trailer angle detection or estimation system, with the corresponding trailer angle being the trailer angle at the time the wheel position was captured. In some examples, once the data set has been sufficiently populated, the process 300 ceases adding data to the data set. In other examples, the process can be continuously updated with new detections as they become available, and the accuracy of the resulting estimation is continuously improved throughout the use of the vehicle.

Figure 5:
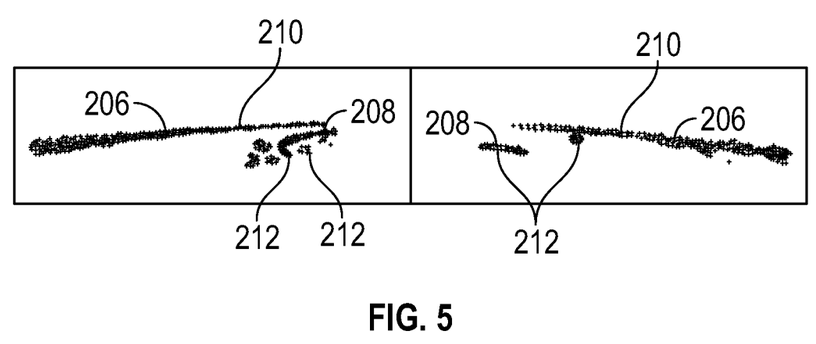
FIG. 5 illustrates the data set of FIG. 4 with the data sorted into clusters.

In some cases, incorrect wheel position determinations can occur and may be added to the data set 204, resulting in additional data points 208 that could skew or otherwise impact the resulting estimation curve. In order to remove the false detections from the data set 204, and improve the resolution wheel position estimation, the raw data points 206 are clustered in a "Data Clustering" step 304. The clustering groups each data point 206 with nearby adjacent data points 206 based on the proximity of the data points 206 to other data points 206 and the density of the data points 206. In some example systems the clustering is done using one or more of a k-mean clustering process, a dbscan (density based spatial) clustering process, distribution based clustering process, a fuzzy clustering process, a mean shift clustering process, and a Gaussian mixed model clustering process. The clustering process results in multiple distinct clusters 210, 212 of wheel detections. It is appreciated that, in each view 102, 104, genuine wheel detections (data points 210) will result in a single elongated cluster 210 having a generally teardrop shape. False wheel detection 208 will result in one or more additional clusters 212, with the additional clusters 212 being random shapes.

Once the data is clustered, the clusters 212 related to false wheel detections 208 are discarded in a "Cluster Down Selection" step 306. In some examples, the cluster down selection can discard the data points 208 entirely, while in other examples, the data points 208 can be retained and flagged as false detections with the flagged false detections ignored for the remainder of the process 300. When retained, the data points can be reviewed later to improve the wheel detection systems, or used for other diagnostic features. For ease of reference, the clusters 210 including accurate wheel detections are referred to as "primary data clusters". In an example using views 102, 104 from each side of the vehicle, such as the example illustrated in FIGS. 4-7, two primary data clusters 210 exist and are retained. In alternate examples where only a single side (corresponding to a single view 102, 104) is utilized, a single primary data cluster is retained.

Figure 6:
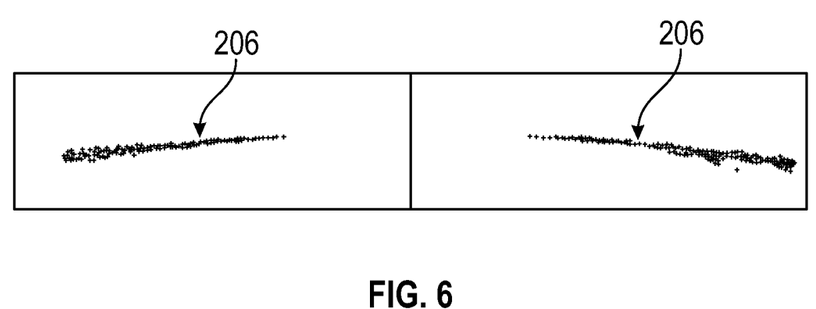
FIG. 6 illustrates the data set of FIG. 4 reduced to a primary cluster within each image.
Figure 7:
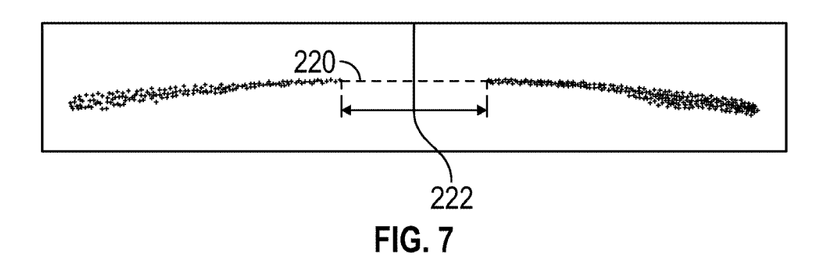
FIG. 7 illustrates a best fit curve line of the data set from FIGS. 4-7.

After discarding the clusters 212 containing false wheel detections, a single set of accurate wheel detections 206, illustrated in FIG. 6, remains. The process 300 determines a best fit curve that applies to all the wheel detections in both primary data clusters 210. In one example, the best fit curve is a parabolic line defined by a second order equation and that is the best fit for all the data across both the primary data clusters 210. In another example, the best fit curve is a parabolic line defined by a third order (cubic) equation. As used throughout, the best fit curve refers to the statistically determined curve that best approximates the trend of the scatter plot generated by the data.

The parabola defined by the second order best fit curve extends beyond each data cluster 210 and bridges a gap 222 between the low trailer angle of each data cluster. Cubic or other types of polynomial fits may be used for the data cluster. With continued reference to FIGS. 4-7 and 9, FIG. 8 illustrates parabola defining the best fit curve 220 isolated from the data, with a 0 degree trailer angle located in the center of the chart, and the trailer angle increasing to the right, and decreasing to the left of the chart. As the wheel position corresponds to the trailer angle, the CMS estimates that the wheel position is at the best fit line while the trailer angle is between negative 10 degrees and positive 10 degrees. In alternative examples, the gap 222 can be in different positions, however the estimation process can remain the same.

In yet further examples, once the best fit curve has been established, the best fit curve 220 can be used to estimate the wheel position any time the CMS cannot identify a wheel position in the image By way of example, if one of the cameras generating the views 102, 104 were to malfunction, or if a field of view 102, 104 becomes entirely or partially obstructed, the estimation can continue to provide an estimated wheel position as long as the trailer angle is determinable.

The estimation system and process described above generates an estimated wheel position with the image generated by the views 102, 104. The CMS controller and/or other vehicle system controllers convert the estimated image position to a corresponding three-dimensional real-world position and the corresponding three-dimensional position can be used as needed.

In at least one example, the estimated wheel position is provided form the CMS controller to a trailer end detection module within the CMS system. The trailer end detection module can be a software module also positioned within the controller or a separate software system in communication with the CMS controller. The trailer end detection module uses the wheel location to assist in identifying the trailer end, and the trailer end position is marked in a CMS display to improve situational awareness of the vehicle operator. In another example, the wheel position may also be used by the CMS to estimate a position of the entire wheelbase and the wheelbase position can then be used within the CMS.

The above described technique can be used to adjust display awareness lines (e.g., trailer end line and distance line) for display as the trailer articulates during normal vehicle operation, particularly during relatively slight articulations of the trailer.

Figure 10:
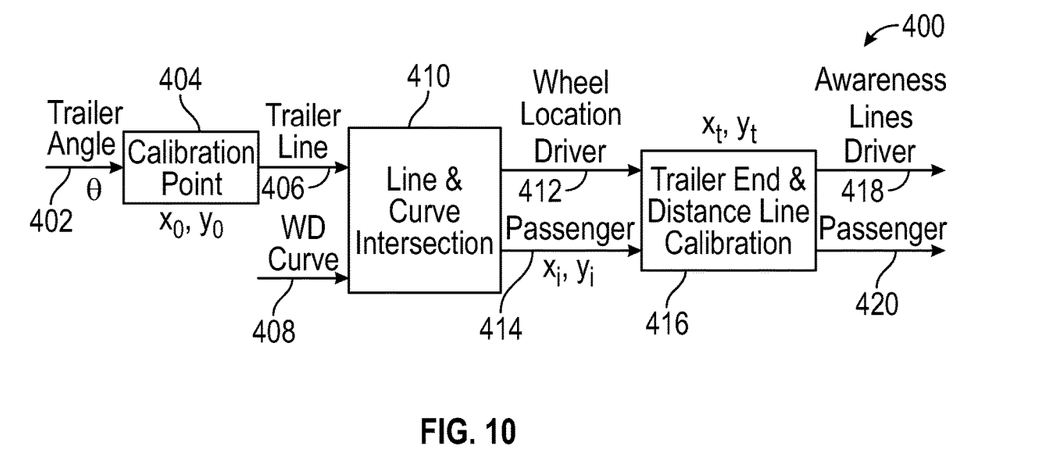
FIG. 10 depicts a process flow chart for providing a trailer end awareness line according to the disclosed method.
Figure 11:
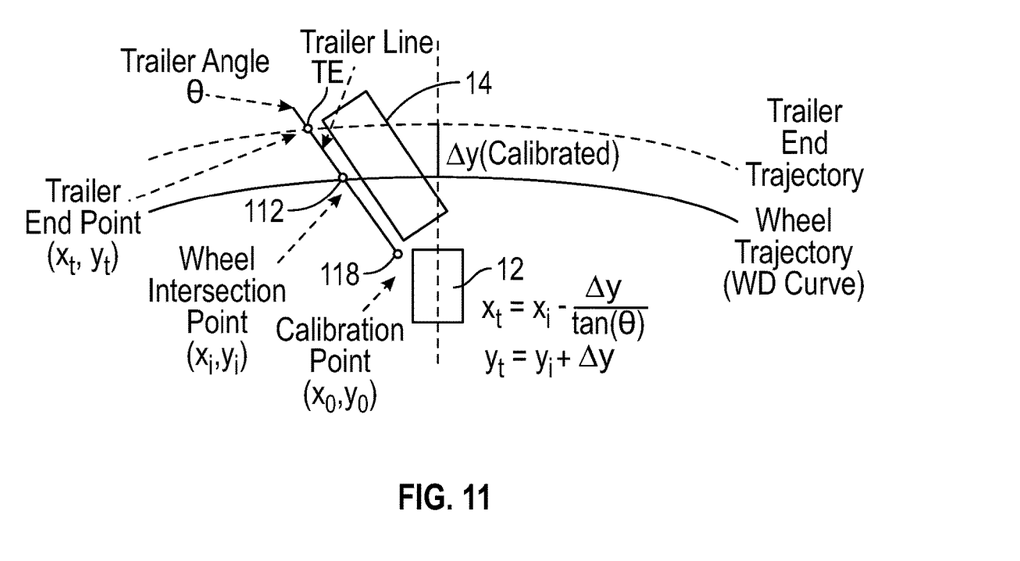
FIG. 11 is a diagram illustrating the method for determining the trailer end awareness line for a passenger side of the tractor-trailer.
Figure 12:
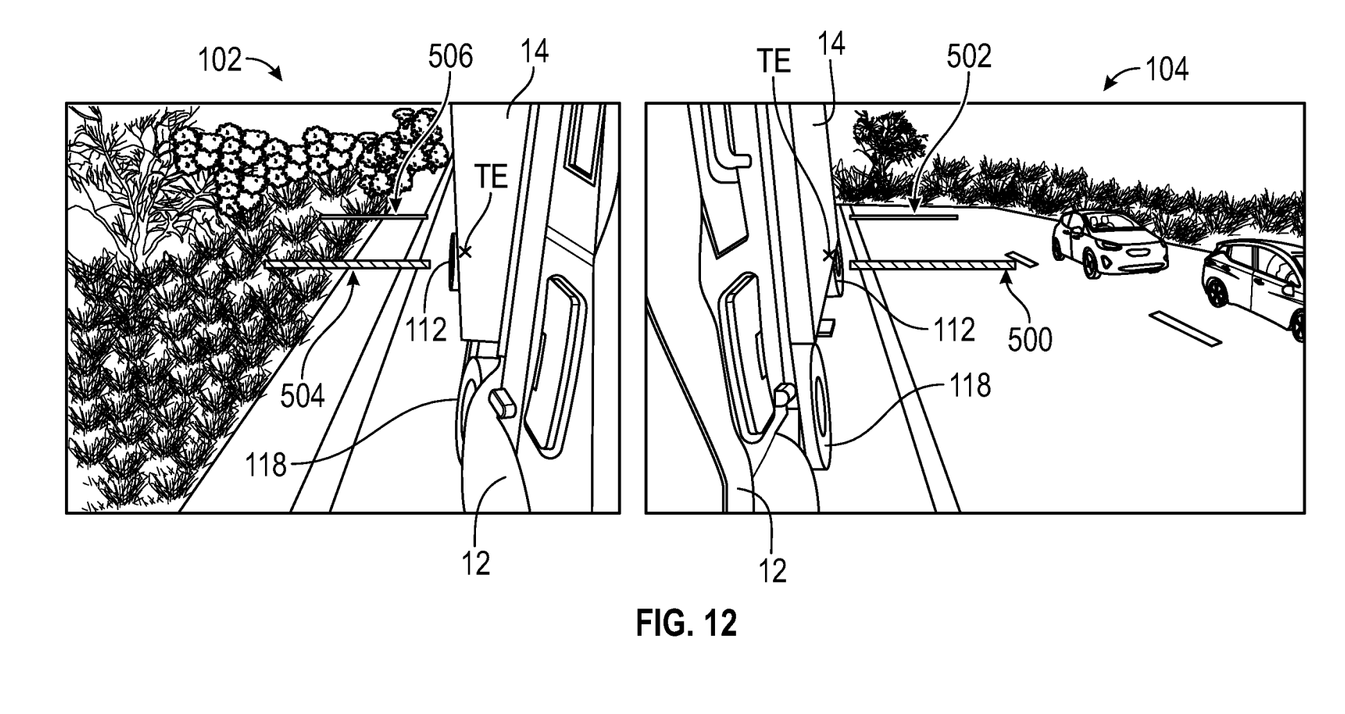
FIG. 12 illustrates displayed passenger and drive side trailer end awareness lines for a straight trailer, i.e., 0° steering angle.
Figure 13:
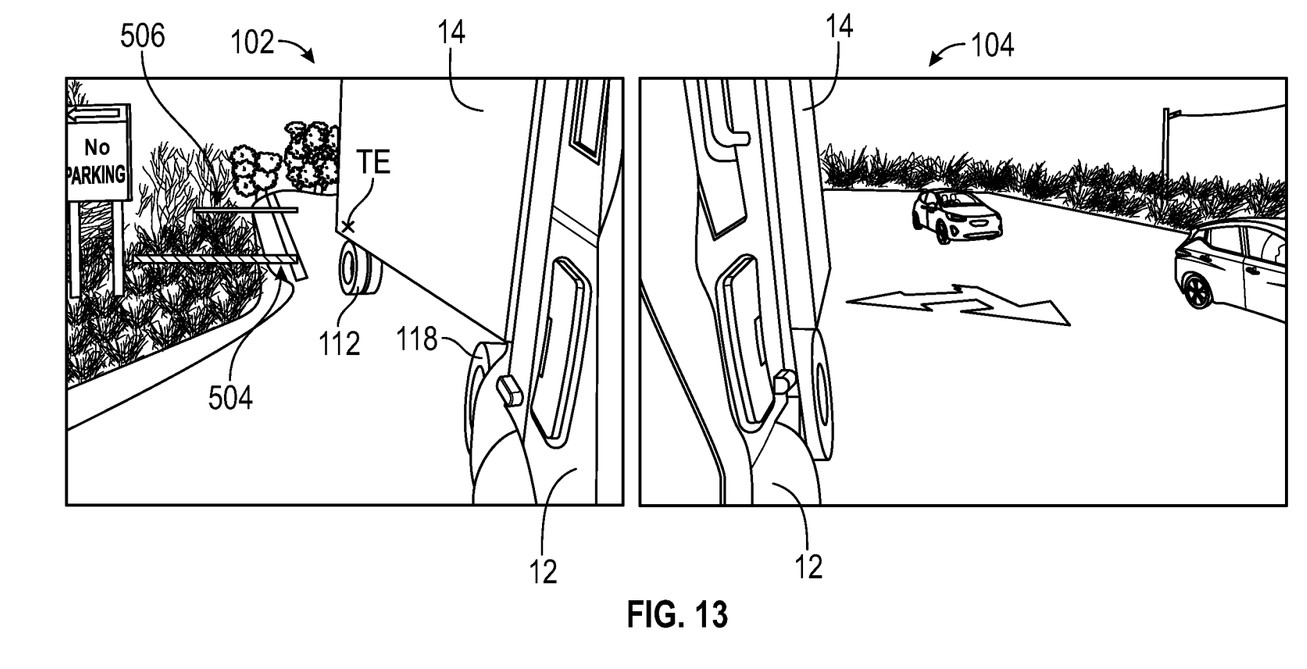
FIG. 13 illustrates passenger and driver side displays with trailer end awareness lines for a steering angle greater than 0° but less than a predetermined steering angle.
Figure 14:
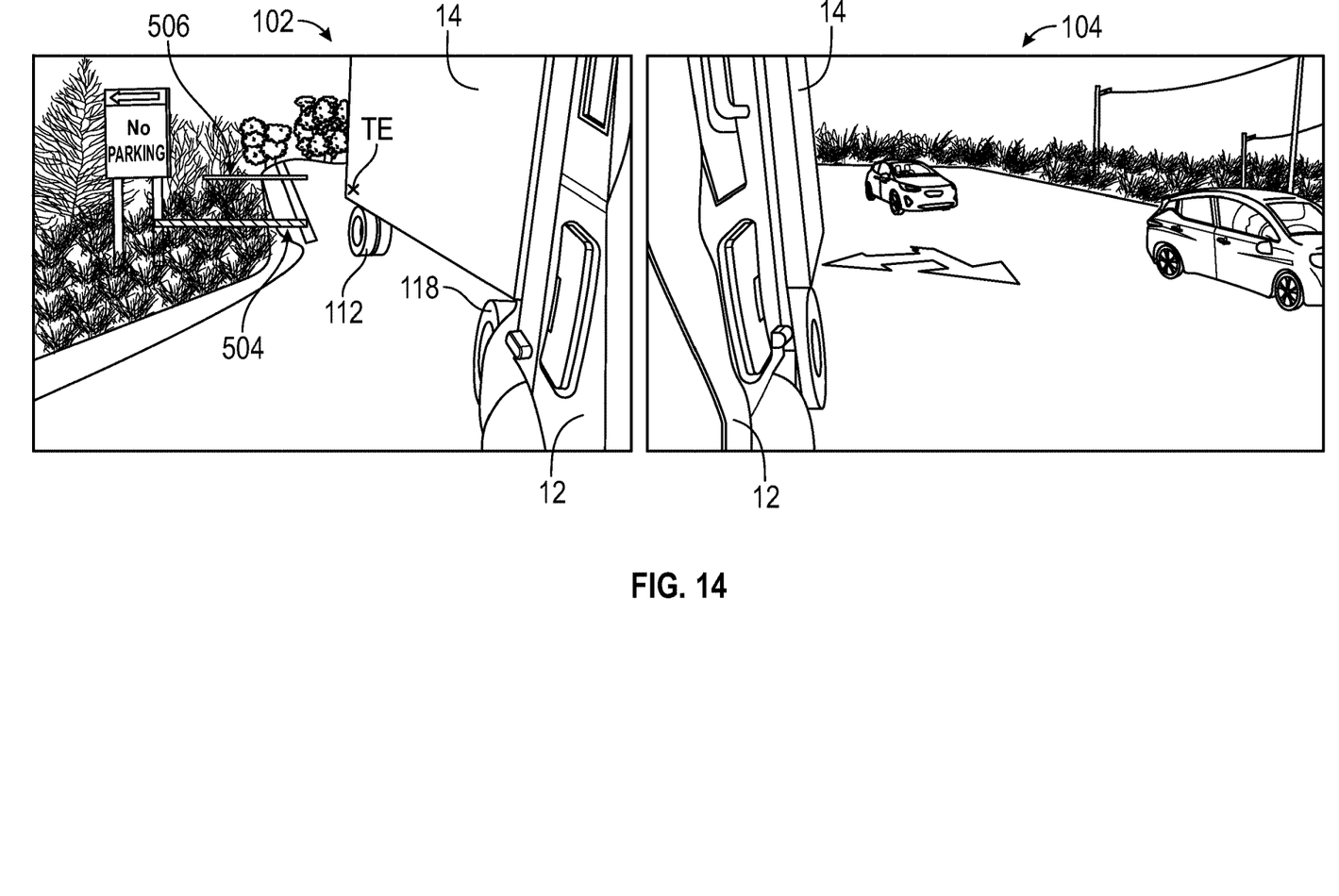
FIG. 14 illustrates passenger and driver side displays with trailer end awareness lines for a steering angle greater than that shown in FIG. 13 but still less than a predetermined steering angle.

With reference to FIGS. 10 and 11, the system's controller is programmed to perform a method 400 that provides at least one trailer end awareness line for a tractor-trailer (418, 420; displayed in FIGS. 12-14 as lines 500, 502, 504 and/or 506). A trailer angle θ of the trailer 14 relative to the tractor 12 is determined at 402, for example, using a trailer angle sensor, a CMS image analysis, or a combination thereof. During forward driving, the trailer angle θ is computed with kinematic model that uses tractor speed, steering angle, etc. The trailer angle θ corresponds to a real-world 3D angle between the tractor 12 and the trailer 14 that is then converted to a 2D image space trailer angle. That is, the 3D trailer angle θ may have a vertical component due to inclines, and the 2D value only has the horizon components, x and y. A calibration point ($x_o$, $y_o$) is determined (block 404) using a fixed point on the tractor 12, for example, by estimating a tractor wheel 118 position. This tractor wheel estimating can be performed as described above in connection with FIGS. 3A-9.

Geometrically, a trailer line 406 is arranged at the 2D trailer angle θ from the fixed calibration point ($x_o$, $y_o$). The lateral and longitudinal offset can be adjusted with this converted 2D angle. The trailer line denotes the direction of the trailer 14 with respect to tractor 12. A reference point on the trailer 14 is determined, for example, by estimating a trailer wheel 112 position, which may be the aftmost trailer wheel. This trailer wheel estimating also can be performed as described above in connection with FIGS. 3A-9.

The trajectory of the reference point (i.e., wheel trajectory, or "WD curve"; at 408 in FIG. 10) corresponds to the trailer wheel position 112 fitted as a parabola, as shown in FIG. 11. An intersection point ($x_i$, $y_i$) (block 410) between the trailer line and a trajectory of a reference point on the trailer can then be solved for the drive and/or passenger side wheel locations (at 412, 414 in FIG. 10).

The trailer end trajectory necessarily follows a predictable arcuate path aft of the trailer wheel trajectory. The trailer end point TE ($x_t$, $y_t$), (block 416) also lies along the trailer line, so a trailer end point determining step includes calculating a relationship between the intersection point and the trailer endpoint in a tractor longitudinal direction, y, and a tractor lateral direction, x. Since the trailer end trajectory will be like the wheel trajectory, with a Δy pixels (calibrated) shift up in the image space. Δy may vary between different trailers. The awareness line feature may use a default value for Δy, if desired, to simplify the calculation. That is, Δy can be an input for a particular trailer, or it can be determined according to any number of approaches, for example, as disclosed in U.S. Ser. No. 63/257,165, entitled TRAILER END TRACKING IN A COMMERCIAL VEHICLE CAMERA MIRROR SYSTEM, incorporated herein by reference in its entirety. Combining the intersection point, the trailer line, and Δy, the trailer end position in both lateral ($x_t$) and longitudinal ($y_t$) direction can be calculated according to the relationships $$x_t = x_i - \frac{\Delta y}{\tan(\theta)} \quad \text{Equation 1}$$

$$y_t = y_i + \Delta y. \quad \text{Equation 2}$$

With the above relationships determined, one or more trailer end awareness lines can be displayed one or more of the displays 18a-18c within the cabin 22. In the examples shown in FIGS. 12-14, any trailer end awareness lines 500-506 are spaced from the trailer end point TE. Throughout vehicle operation and during articulation of the trailer 14 relative to the tractor 12, the displayed trailer end awareness line(s) are adjusting according to a change in the determined trailer angle θ based upon the method described above. In this manner, the awareness lines are dynamically adjusted in both lateral and longitudinal direction.

The amount steering angle θ can be used to determine which trailer end awareness lines are displayed to the driver and where those lines are displayed (i.e., driver side and/or passenger side displays 18a, 18b). For example, when trailer angle is very small (i.e., trailer is straight, around 0°), the awareness line is shown on both driver and passenger sides, as shown in FIG. 12. In one example, a first trailer end awareness line (500, 504) is used to indicate the trailer end TE projected onto the ground at the horizon. A second trailer end awareness line (502, 506) may be used aft of the trailer end TE, for example, 30 meters, to assist the driver in passing vehicles or other objects in adjacent lanes or spaces to either side of the trailer 14. In one example, the first awareness line is displayed in a first color (e.g., red), and the second awareness line is displayed in a second color (e.g., yellow) different than the first color.

In another example, when one side of the trailer 14 is visible and the other side is invisible, only the visible side awareness line will be shown (FIGS. 13 and 14). The steering angle θ can be used to determine what side is visible and invisible. For example, the trailer end awareness line(s) is displayed on one side only of trailer for steering angles greater than 0° but less than a predetermined steering angle. The trailer end awareness line is displayed only on a side of an inner turning radius of the trailer end. The predetermined angle may be 10° or 15°, for example. The trailer end awareness line(s) are not displayed at all for steering angles above the predetermined steering angle. Knowing trailer end position during small trailer angles enhances driving safety in situations such as changing lanes while driving straightly on highway, or in low light conditions or heavy rain.

The disclosed method and system provide an approach to adjust the lateral position of awareness lines at the end of trailer based on tractor-trailer angle. The awareness line can be placed at appropriate lateral location for driver's depth perception purpose of the surrounding vehicles.

Although an example embodiment has been disclosed, a worker of ordinary skill in this art would recognize that certain modifications would come within the scope of the claims. For that reason, the following claims should be studied to determine their true scope and content.

What is claimed is:

1. A method of providing a trailer end line for a tractor-trailer, the method comprising:
   determining a fixed point on a tractor;
   determining a trailer angle of a trailer;
   determining a trailer line arranged at the trailer angle from the fixed point;
   determining an intersection point between the trailer line and a trajectory of a reference point on the trailer;
   determining a trailer end point along the trailer line and offset from the intersection point; and
   displaying a trailer end awareness line based upon the determined trailer end point.

2. The method of claim 1, wherein the fixed point determining step includes estimating a tractor wheel position.

3. The method of claim 2, wherein the tractor wheel position estimating includes:
   identifying a first set of wheel locations in at least a first image, each of the wheel locations in the first set of wheel locations being associated with a corresponding trailer angle;
   clustering the first set of wheel locations and identifying a primary cluster in the first set of wheel locations;
   generating a best fit curve applied to the primary cluster, the best fit curve being a curve associating wheel position to trailer angle;
   identifying an estimated wheel position by applying a determined trailer angle to the best fit curve in response to the wheel being hidden in the first image; and
   outputting the estimated wheel position to at least one additional vehicle system.

4. The method of claim 1, wherein the trailer angle determining step includes using a trailer angle sensor, a CMS image analysis, or a combination thereof.

5. The method of claim 4, comprising a step of adjusting the displayed trailer end awareness line according to a change in the determined trailer angle.

6. The method of claim 1, wherein the reference point is determined by estimating a trailer wheel position.

7. The method of claim 6, wherein the trajectory of the reference point corresponds to the trailer wheel position fitted as a parabola.

8. The method of claim 6, wherein the trailer wheel position estimating includes:
   identifying a first set of wheel locations in at least a first image, each of the wheel locations in the first set of wheel locations being associated with a corresponding trailer angle;
   clustering the first set of wheel locations and identifying a primary cluster in the first set of wheel locations;
   generating a best fit curve applied to the primary cluster, the best fit curve being a curve associating wheel position to trailer angle;
   identifying an estimated wheel position by applying a determined trailer angle to the best fit curve in response to the wheel being hidden in the first image; and
   outputting the estimated wheel position to at least one additional vehicle system.

9. The method of claim 6, wherein trailer end point determining step includes calculating a relationship between the intersection point and the trailer endpoint in a tractor longitudinal direction, y, and a tractor lateral direction, x.

10. The method of claim 9, wherein the relationship is calculated according to the equations $$x_t = x_i - \frac{\Delta y}{\tan(\theta)} \text{ and } y_t = y_i + \Delta y,$$

wherein $x_i$, $y_i$ correspond to the wheel intersection point, $x_t$, $y_t$ correspond to the trailer end point, and θ corresponds to the steering angle.

11. The method of claim 10, wherein the displayed trailer end awareness line is spaced from the trailer end point.

12. The method of claim 1, wherein the trailer end awareness line is a first awareness line displayed in a first color and corresponding to a location of the trailer end projected on ground at a location beneath the trailer end, the displaying step includes displaying a second awareness line in a second color different than the first color, and the second awareness line corresponds to a location on the ground a distance aft of the first awareness line.

13. The method of claim 1, wherein the trailer end awareness line is displayed on one side only of trailer for steering angles greater than 0° but less than a predetermined steering angle.

14. The method of claim 13, wherein the trailer end awareness line is displayed only on a side of an inner turning radius of the trailer end.

15. The method of claim 13, wherein the trailer end awareness line is displayed on both sides of trailer for steering angles around 0°, and the trailer end awareness lines are not displayed at all for steering angles above the predetermined steering angle.

16. A camera mirror system comprising:
   a camera arm having a camera with an image capture unit configured to capture a desired field of view, the desired field of view including at least one of Class II and Class IV views;

a display configured to display the desired field of view;
a controller in communication with the image capture unit and the display, the controller configured to:
   determine a fixed point on a tractor;
   determine a trailer angle of a trailer;
   determine a trailer line arranged at the trailer angle from the fixed point;
   determine an intersection point between the trailer line and a trajectory of a reference point on the trailer;
   determine a trailer end point along the trailer line and offset from the intersection point; and
   display a trailer end awareness line on the display based upon the determined trailer end point.

17. The system of claim 16, wherein the fixed point is determined by estimating a tractor wheel position.

18. The system of claim 16, wherein the trailer angle is determined using a trailer angle sensor, a CMS image analysis, or a combination thereof.

19. The system of claim 16, wherein the controller is configured to adjust the displayed trailer end awareness line according to a change in the determined trailer angle.

20. The system of claim 16, wherein the reference point is determined by estimating a trailer wheel position.

* * * * *